(12) United States Patent
Lane

(10) Patent No.: US 11,828,081 B2
(45) Date of Patent: *Nov. 28, 2023

(54) GRAVITATIONAL BOUYANCY FILTER FOR A SWIMMING POOL

(71) Applicant: Jeffrey Lane, Inglewood, CA (US)

(72) Inventor: Jeffrey Lane, Inglewood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,790

(22) Filed: Mar. 31, 2023

(65) Prior Publication Data
US 2023/0323694 A1    Oct. 12, 2023

Related U.S. Application Data

(63) Continuation-in-part of application No. 17/066,446, filed on Oct. 8, 2020, now Pat. No. 11,180,389.

(51) Int. Cl.
*E04H 4/12*    (2006.01)

(52) U.S. Cl.
CPC ................... *E04H 4/1209* (2013.01)

(58) Field of Classification Search
CPC ................. E04H 4/1209; C02F 1/00
USPC ....................................... 210/167.2
See application file for complete search history.

(56) References Cited

U.S. PATENT DOCUMENTS

| | | | | |
|---|---|---|---|---|
| 4,030,148 A * | 6/1977 | Rosenberg | ............ | E04H 4/1254 134/167 R |
| 4,348,192 A * | 9/1982 | Pansini | ................. | E04H 4/1681 440/38 |
| 4,640,783 A * | 2/1987 | Kern | .......................... | C02F 1/78 210/765 |
| 4,889,622 A * | 12/1989 | Newcombe-Bond | ....................... | E04H 4/1654 134/167 R |
| 5,279,728 A * | 1/1994 | Weiss | ..................... | B01D 35/05 210/167.2 |
| 5,676,839 A * | 10/1997 | Shippert | ............... | E02B 15/101 210/91 |

(Continued)

*Primary Examiner* — Ekandra S. Miller-Cruz

(57) ABSTRACT

A floating water jet for spraying chlorinated water at water surface of a pool is disclosed herein. The floating water jet includes a cylindrical body having a closed end and an open end, an internal wall within the cylindrical body defining a sealed air chamber within the cylindrical body adjacent the closed end, the sealed chamber providing buoyancy to the cylindrical body such that the cylindrical body floats on the water surface of the pool with a longitudinal axis of the cylindrical body being parallel to the water surface. An internal chamber is provided within the cylindrical body between the open end and the internal wall for receiving the chlorinated water. An end wall is sealed to the open end, the end wall including a central inlet opening adapted for connection to an outlet end of a floating pool hose, and a plurality of outlet openings in the end wall arranged concentrically about the central opening. Chlorinated water from the pool hose is directed into the internal chamber via the central inlet opening and exits the internal chamber via the plurality of outlet openings to direct jets of the chlorinated water in a direction parallel to the water surface. The floating pool hose, a filter attached around a circumference of the pool hose, together with the pool jet, for establishing the system as a gravitational buoyancy filter.

1 Claim, 1 Drawing Sheet

(56) References Cited

U.S. PATENT DOCUMENTS 5,788,850 A * 8/1998 Tuomey ............... E04H 4/1263
                 210/167.2
2014/0202941 A1* 7/2014 Iacovacci ........... B01D 21/0087
                210/167.18

* cited by examiner

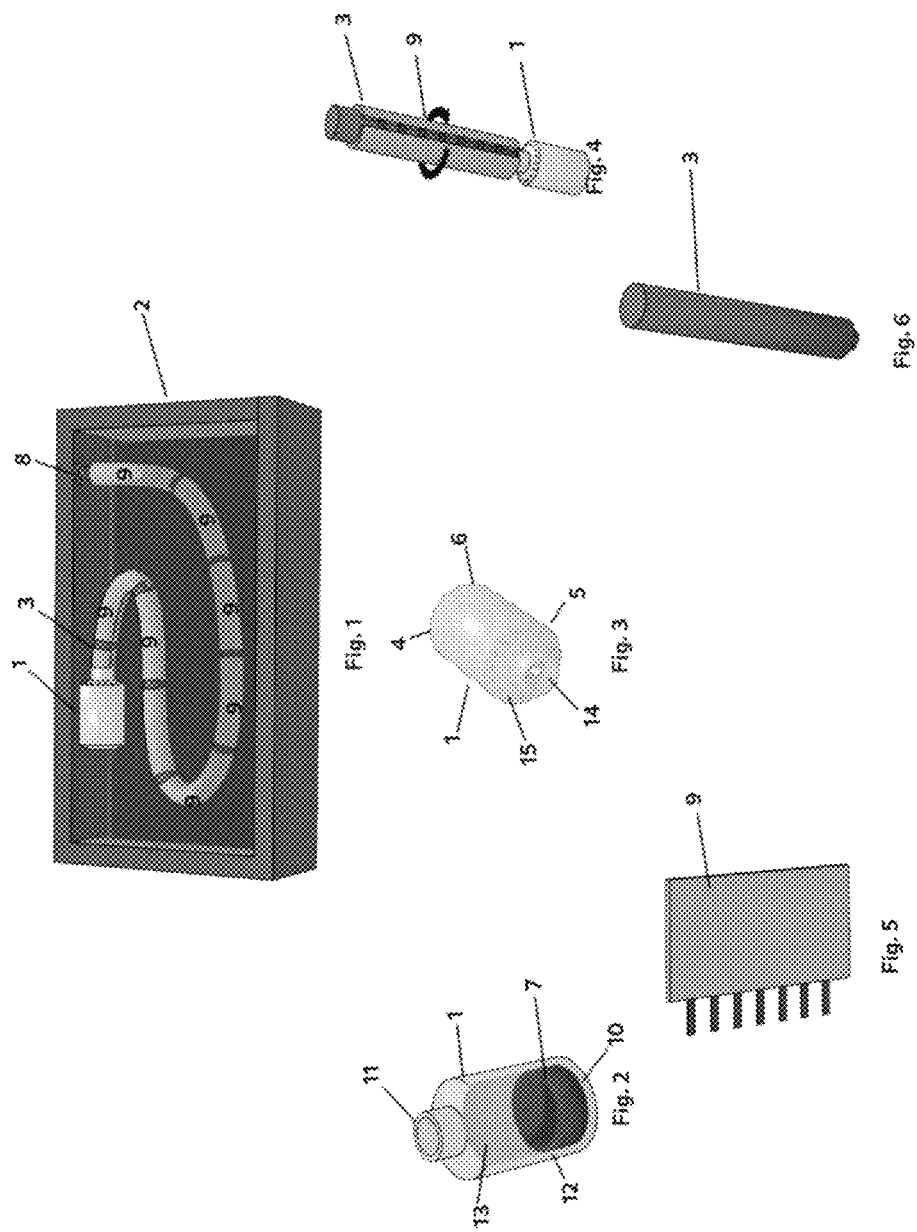

GRAVITATIONAL BOUYANCY FILTER FOR A SWIMMING POOL

BACKGROUND OF THE INVENTION

The majority of pool cleaning methods using "chlorine" as the cleaning agent, attempt to clean the entire body of pool water indiscriminately. This is done by "dumping" chlorine (chlorinate acid) into the pool in large enough amounts to meet the total chlorine demand of the entire pool. In a typical residential pool, chlorinated water enters the pool below the water's surface. The chlorine immediately begins to disinfect and sanitize the water it encounters as it sinks to the bottom of the pool. The "unused" chlorine collects at the pool's bottom (the chlorine is at its highest concentration at this point). From there the chlorine passively spreads throughout the pool. When the chlorine is completely mixed in the water, the concentration of chlorine is approximately the same throughout the pool. Thus, the chlorine reaches the surface only after it is "fully diluted", at its lowest concentration. However, the pump filtering systems typically used for pool water management is virtually a closed system, with one very large exception. The pool water surface. That is to say that nearly 100% of contaminating agents and processes deleterious to a healthy clean pool (algae growth, etc.) are introduced and/or begin near the pool water surface. And much of those contaminating agents remain at the water's surface for a significant amount of time before migrating to other parts of the pool. Also, the oxidation process for eliminating contaminants from the pool also begins at the water's surface. So, rather than applying chlorination equally and indiscriminately to the entire body of pool water (which results in diluting the chlorine to its lowest level at the pool surface), a vastly more effective process would be to strategically apply the chlorination directly to the pool water surface. So that, in a perfect system, the chlorine would sanitize and disinfect the surface water first. Only then, would "unused" chlorine be available to attack the "level" below the surface. Once that first level below the surface was sanitized and disinfected, then any "unused" chlorine could attack level 2, and then level 3, and so on. This process continuing until any "unused" chlorine could reach the bottom of the pool, at which point, the entire body of pool water having been sanitized and disinfected, additional chlorine would then be available to decontaminate the walls of the pool.

The removal of debris which falls onto the surface water of a pool is required to maintain a clean healthy pool. Typically, this function is performed by a skimmer or a person using a net attached to a pole.

SUMMARY OF THE INVENTION

It is an object of the invention to provide a gravitational/buoyancy filter by causing much of surface debris to lose its buoyancy and fall to the bottom of the pool by "washing" the surface of the pool using return water from the pool pump with a pool jet.

It is a further object of the invention to provide chlorine to entire pool surface with the pool jet.

It is a further object of the invention to increase the efficiency of the chlorine used using the pool jet.

It is a further object of the invention to remove debris from pool water surface using the pool jet thereby eliminating the need for a skimmer.

It is a further object of the invention to disinfect and sanitize an entire pool using the pool jet much quicker, thereby reducing energy costs.

It is an additional objection of the invention to capture other debris in filters affixed around the exterior of the pool hoses which trail the pool jet.

It is a further object of the invention to cause most of the debris in the entire body of water to fall by 5 means:

a) Surface Vortexes—Vortexes are created at the pool surface, forcing the less buoyant material downward toward the pool floor. These downward vortex forces give rise to upward counter-forces some distance away from the vortexes that push more buoyant material upward toward the pool surface, ensuring that floating debris in the entire pool will be subject to the buoyancy-stripping forces at work in this pool;

b) Inundation—The trailing pool hose, affixed with filter elements, is repeatedly dragged across the water surface. Thus, any floating debris that the filter elements comes in contact with will be dragged through and/or submerged under the water.

c) Turbulence—Waves are created by the movement of the "Floating Water Jet" and the pool hose. This makes the water surface less smooth and "harder" for debris to stay afloat on;

d) Irrigation—Water spray from the "Floating Water Jet" tends to soak any debris floating on the surface that it encounters;

e) Agitation—Beneath the water surface, water from the jets of the "Floating Water Jet" agitate the water, tending to further water-log any debris in the immediate vicinity.

BRIEF DESCRIPTION OF THE DRAWINGS

FIG. 1 shows a system including a pool, pool jet, pool hose connected to the pool jet, and filters attached to the pool hose.

FIG. 2 shows interior parts of the pool jet.

FIG. 3 shows a side view of the pool jet.

FIG. 4 shows the pool jet, pool hose attached to the pool jet, and filter attached to the pool hose.

FIG. 5 shows a filter for attachment to the pool hose.

FIG. 6 shows the pool hose.

DESCRIPTION OF THE PREFERRED EMBODIMENT

This invention is a system (see FIG. 1) which includes one integral unit 1 (referred to as the Pool Jet) disposed within a pool 2 comprised of a fitting 4 (see FIG. 3) which attaches to a standard pool hose 3 precisely in the same manner that individual hose sections connect to one another. This fitting 4 immediately connects to the body 5 of the device, which essentially is a "can" having a diameter slightly larger than the hose diameter. The hose-side of the "can" having small holes 6 around the rim in the space between the hose diameter and the rim diameter. The can has an air chamber 7 at the end opposite the hose-side, which causes it to float on top of the water (see FIG. 2). The device connects to the end of a series of pool hoses. The other end of that series of hoses in turn connects to the water return port 8 from a filter pump of a pool. When the pool pump is activated, the water flowing through the hoses is forced out of the small holes of the device, pushing the device forward over the surface of the pool.

The other part of this system includes filter elements which are affixed around the surface area of the pool hoses which trail the pool jet (see FIGS. 1, 4, and 5).

In summary a floating water jet 1 for spraying chlorinated water at water surface of a pool 2 is shown in FIG. 1. The water jet includes a cylindrical body 5 having a closed end 10 and an open end 11, an internal wall 12 within the cylindrical body defining a sealed air chamber 7 within the cylindrical body adjacent the closed end, whereby the sealed chamber provides buoyancy to the cylindrical body such that the cylindrical body floats on the water surface of the pool with a longitudinal axis of the cylindrical body being parallel to the water surface. An internal chamber 13 is provided within the cylindrical body between the open end and the internal wall for receiving the chlorinated water. An end wall 14 is sealed to the open end, wherein the end wall includes a central inlet opening 15 adapted for connection to an outlet end of a floating pool hose 3, and a plurality of outlet openings 6 in the end wall arranged concentrically about the central opening, whereby chlorinated water from the pool hose is directed into the internal chamber via the central inlet opening and exits the internal chamber via the plurality of outlet openings to direct jets of the chlorinated water in a direction parallel to the water surface. The floating water jet 1 can be disposed in the swimming pool 2. A return port 8 in a wall of the swimming pool provides a flow of chlorinated water back to the swimming pool. A floating pool hose 3 is disposed in the pool, the pool hose having an inlet end connected to the return port and an outlet end connected to the central inlet opening of the floating water jet. A filter 9 is attached around a circumference of the pool hose.

The invention claimed is:

1. A swimming pool, comprising:
  a floating water jet, for spraying chlorinated water at water surface of the swimming pool, comprises:
    a cylindrical body having a closed end and an open end;
    an internal wall within the cylindrical body defining a sealed air chamber within the cylindrical body adjacent the closed end, whereby the sealed chamber provides buoyancy to the cylindrical body such that the cylindrical body floats on the water surface of the pool with a longitudinal axis of the cylindrical body being parallel to the water surface;
    an internal chamber within the cylindrical body between the open end and the internal wall for receiving the chlorinated water;
    an end wall sealed to the open end, wherein the end wall includes a central inlet opening adapted for connection to an outlet end of a floating pool hose, and a plurality of outlet openings in the end wall arranged concentrically about the central opening, whereby chlorinated water from the pool hose is directed into the internal chamber via the central inlet opening and exits the internal chamber via the plurality of outlet openings to direct jets of the chlorinated water in a direction parallel to the water surface;
  wherein the floating water jet is disposed in the swimming pool; wherein the floating water jet comprises
  a return port in a wall of the swimming pool for providing a flow of chlorinated water back to the swimming pool; and
  a floating pool hose disposed in the pool, the pool hose having an inlet end connected to the return port and an outlet end connected to the central inlet opening of the floating water jet; and
  a filter attached around a circumference of the pool hose; and
  wherein the combination of the floating pool hose, the filter and the floating water jet in the swimming pool is configured to function as a gravitational buoyancy filter.

* * * * *